(12) United States Patent
Ghaleb et al.

(10) Patent No.: US 7,710,313 B2
(45) Date of Patent: May 4, 2010

(54) METHOD OF USING A MICROWAVE AND MILLIMETER FREQUENCY BISTATIC RADAR FOR TRACKING AND FIRE CONTROL

(75) Inventors: Sam Ghaleb, Ridgecrest, CA (US); Floyd A. Kinder, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 87 days.

(21) Appl. No.: 12/176,815

(22) Filed: Jul. 21, 2008

(65) Prior Publication Data

US 2010/0033368 A1   Feb. 11, 2010

Related U.S. Application Data

(62) Division of application No. 11/877,836, filed on Oct. 24, 2007, now Pat. No. 7,486,224.

(51) Int. Cl.
*G01S 13/72* (2006.01)

(52) U.S. Cl. .................. 342/81; 342/354; 342/356; 342/357.16; 342/357.17

(58) Field of Classification Search .......... 701/352–354
See application file for complete search history.

(56) References Cited

U.S. PATENT DOCUMENTS

| 6,232,922 | B1 * | 5/2001 | McIntosh .................... 342/453 |
| 6,388,606 | B1 * | 5/2002 | Keydel et al. .............. 342/25 R |
| 6,549,165 | B2 * | 4/2003 | Neira et al. .................. 342/462 |
| 6,995,705 | B2 * | 2/2006 | Bradford et al. .............. 342/95 |
| 7,155,240 | B2 * | 12/2006 | Atkinson et al. ......... 455/456.2 |
| 7,304,314 | B2 * | 12/2007 | Zaugg ...................... 250/458.1 |
| 2004/0113835 | A1 * | 6/2004 | Jones et al. ................. 342/160 |
| 2005/0151093 | A1 * | 7/2005 | Zaugg ...................... 250/458.1 |
| 2005/0275582 | A1 * | 12/2005 | Mohan ........................ 342/13 |

* cited by examiner

*Primary Examiner*—Thomas G Black
*Assistant Examiner*—Shelley Chen
(74) *Attorney, Agent, or Firm*—Robert R. Lerma

(57) ABSTRACT

A method of using a bistatic passive radar system for tracking a plurality of targets utilizing transmitted radar signals from at least one satellite platform in a geosynchronous orbit with the earth, a radar receiver capturing signals from a reflection of the transmitted radar signals from each target, tracking a position of each target over time, and a processing method for computation of a fire control solution of each target.

6 Claims, 2 Drawing Sheets

US 7,710,313 B2

METHOD OF USING A MICROWAVE AND MILLIMETER FREQUENCY BISTATIC RADAR FOR TRACKING AND FIRE CONTROL

CROSS-REFERENCE TO RELATED APPLICATIONS

This is a divisional application that claims the benefit of the filing date of a continuation application (Ser. No. 11/877,836) filed on Oct. 24, 2007, which in turn claims the benefit of the filing date of a parent application (Ser. No. 11/174,209) filed on Jun. 30, 2005, whereby the entire disclosure of the continuation application (Ser. No. 11/877,836) is incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

BACKGROUND OF THE INVENTION

Ordinary (monostatic) radar systems have to transmitter and receiver co-located on the same platform. This radar has the disadvantage that the transmitter may be detected from a great distance. If used in a military vehicle or aircraft an enemy may easily determine its location. Bistatic radar was developed wherein the transmitter and receiver are located separately, allowing the vehicle or aircraft to receive only and thus avoid detection by an enemy.

A bistatic radar transmitter may be located on a platform that is difficult for an enemy to destroy, such as on a low earth orbit satellite. At present the timing of the low earth orbit systems are known and the enemy has ceased all operation during the surveillance. In addition, low earth orbit satellite radars require a network of many satellites to provide comprehensive coverage. It is possible to have gaps as large as 15 to 20 minutes, creating a handoff problem from one satellite to the next. Therefore, there is a need for a method for continuous surveillance and quiet attack capability in military situations. In addition, passive continuous surveillance and tracking of targets may be useful in homeland security and in commercial applications.

DESCRIPTION OF THE EMBODIMENTS

Before explaining the disclosed embodiments and methods for the present invention in detail it is to be understood that the disclosed embodiments are not limited in their application to the details of the particular arrangements shown. Also, the terminology used herein is for the purpose of description and not of limitation. In the figures, the same reference numbers are used to identify the same components.

Embodiments of the invention include a system and a method for tracking and computing a firing solution for at least one target utilizing bistatic radar. A phased array antenna shall be constructed upon a satellite platform in a geosynchronous orbit with the earth. A radar transmitter shall illuminate a selected area of the earth. A receiving antenna shall receive reflected energy (signal) from targets illuminated. Targets in the illuminated area shall be tracked over time, enabling a fire control solution to be computed for the target(s). The use of a bistatic radar scheme enables the receiving antenna platform (such as an aircraft, a low earth orbit (LEO) satellite, or a land base) to track targets without employing active radar and risk being detected.

Figure 1:
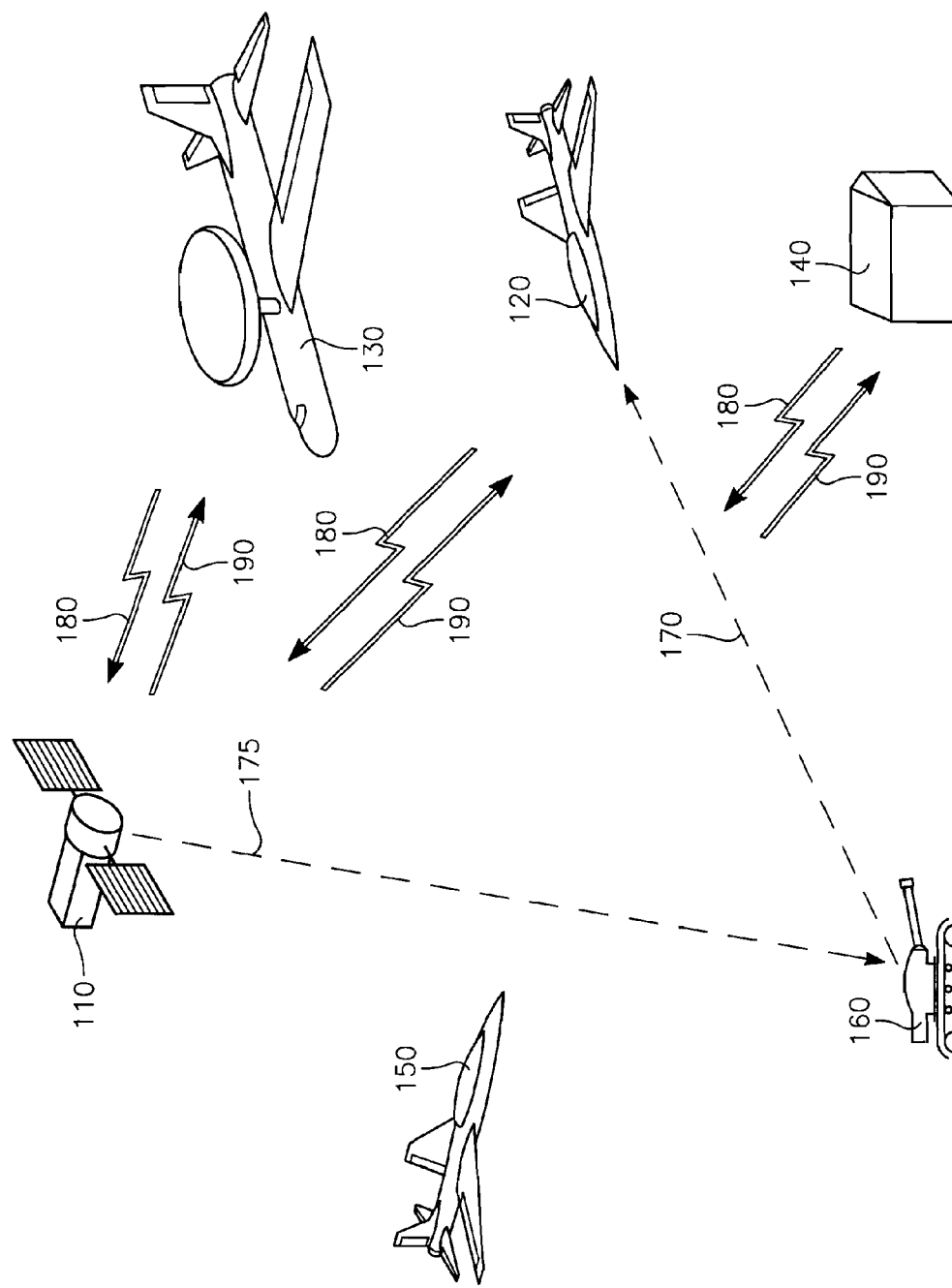
FIG. 1 illustrates radar transmission and reception according to an embodiment of the invention.

FIG. 1 illustrates embodiments of a system for tracking at least one target. A satellite 110 in a geosynchronous orbit with the earth transmits radar signals (or beam) illuminating an area on the earth. This permits continuous coverage of any designated area in the field of view of the satellite.

The radar signals are transmitted utilizing an electronically phase-steered array (phased array) antenna 210 (FIG. 2) so that mechanical steering of the antenna is not necessary, an operation that would be difficult to perform in space. Phased array antennas may be used in space as they can be directed electronically instead of mechanically which avoids a shifting mass. By using a large aperture antenna the energy may be concentrated in a designated area. Large (at least 10 meter aperture size) phased arrays illuminate a larger section of the earth. In an embodiment of the invention the geosynchronous satellite utilizes high power (at least 5 KW) x-band or ka-band radar and a phased array antenna to direct the beam to illuminate selected areas on earth. The transmitter shall include a power source such as solar arrays or a Sterling engine. In an embodiment of the invention the phased array antenna permits the power density per unit area to be increased by reducing the size of the illuminated area (narrower beam). Depending on the type of targets and radar cross section (RCS) of the targets the narrower beam shall facilitate detection and tracking of smaller targets. In addition, various wavelength systems may be utilized for different types of targets. For example, a ku-ka band radar (about 16-35 GHz) may be utilized to detect and track targets such as tanks 160.

Figure 2:
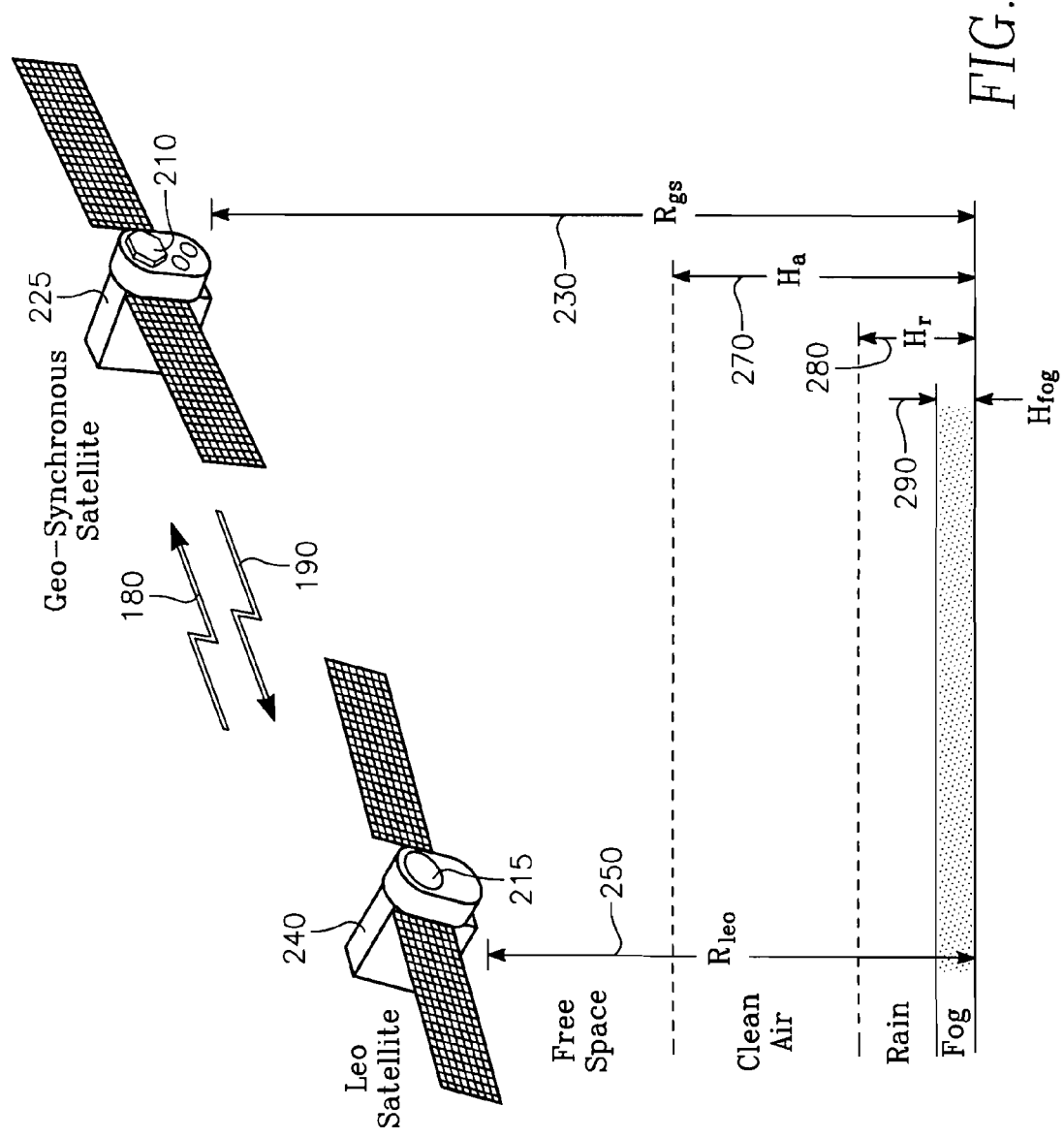
FIG. 2 illustrates the altitude relationships between the transmitter and receiver satellites, relative to the surface of the earth.

As shown in FIG. 1, in an embodiment of the invention the radar signals transmitted by the phased array antenna located upon a satellite platform in a geosynchronous orbit around the earth are received by a receiving antenna on a platform such as, but not limited to, an attack aircraft 120, a command and control aircraft 130, or a land based command and control center 140. The radar receiver shall have the ability to receive the frequency transmitted by the selected transmitter (such as x band or ka band). In one embodiment of the invention an attack aircraft shall receive a reflected radar signal 170 from a target that is illuminated by the radar transmitted from the geosynchronous satellite. In addition, the attack aircraft shall receive a direct first beacon 180 from the satellite radar so as to prompt the attack aircraft to track the target, such as an enemy aircraft 150 or ground target such as a tank 160. In another embodiment of the invention attack aircraft shall have a return second beacon 190 to the geosynchronous radar satellite indicating the tracking. In this way the phased array may be directed to illuminate targets in the area of the aircraft while the aircraft remains passive and undetected. In another embodiment of the invention, continuous coverage of particular area is accomplished utilizing two or more antennas to provide illumination of two or more target areas. Referring to FIG. 2, a communications link (180, 190) may be used to coordinate the operation of two or more bistatic radar simultaneously.

The position of each target shall be tracked over time by systems on the receiving platform. The reflected radar signals are processed into position data tracking the targets over time. The phased array radar illuminates an area of the earth providing a target signal for an attack aircraft. The attack aircraft computer processor system correlates the reflected target signal from the illumination radar and a reference signal from the radar to detect and track the target over time. While tracking the target, the area illuminated will have to be moved. This can be done in rather coarse steps. The size of the step shall be determined by the number of elements in the phased array in the geosynchronous antenna. The fewer the elements, the smaller the array size but the bigger the step. The wavelength depends upon operational requirements and compatibility with existing equipment.

In an embodiment of the invention, subsequent to the tracking of a target over time a firing solution is computed in the systems of the tracking platform. The computation of a firing solution is responsive to the position data. If the tracking platform is close enough to a target a fire control solution may be easily computed due to the reduction in the size of the search area.

Another embodiment of the invention includes a method for tracking at least one target including: transmitting radar signals from at least one satellite in a geosynchronous orbit around the earth, receiving reflected radar signals from each of the targets, processing the reflected radar signals into position data tracking a position of each of the targets over time, and computing a fire control solution responsive to the position data of each of the targets.

Results of Simulation

Waveform Parameters

Radar operating frequency and the waveform are modeled. The waveform includes pulse width and pulse repetition frequency. The x-band frequency was selected since it pertains to current airborne/fire control radar frequencies.

| | | |
|---|---|---|
| $R_{gs} := 22800$ mi | | Geo-Synchronous Satellite Altitude |
| $f := 10$ GHz | | Radar Operating Frequency |
| $\lambda := c/f$ | $\lambda = 0.03$ m | Wavelength of Operating Radar |
| $\tau := 1$ μs | | Pulsewidth of Waveform |
| PRF := 100 KHz | | Pulse Repetition Frequency |
| PRI := 1/PRF | PRI = 10 μs | Pulse Repetition Interval |
| $P_t := 5$ kw | | Peak Transmitter Power |
| $B := 1/\tau$ | $B = 1$ MHz | Noise Bandwidth |

Antenna Parameters

The antenna gain and beam width of the main geosynchronous antenna may be modeled by defining antenna diameter and overall efficiency.

| | | |
|---|---|---|
| $D_t := 12$ m | | Transmit Antenna Size |
| $\eta_t := 60\%$ | | Transmit Antenna Efficiency |
| $G_t := \eta_t * (\pi D_t/\lambda)^2$ | | Transmit Antenna Gain |
| $G_{t\_dB} := 10 \log(G_t)$ | $G_{t\_dB} := 59.772$ | Transmit Antenna Gain in dB |
| $\theta_{t\_3dB} := 1.02 * (\lambda/D_t)$ | $\theta_{t\_3dB} = 0.146$ deg. | Transmit Antenna Beamwidth |

Low Earth Orbit Satellite

The receiving antenna may be on an aircraft but in this simulation a low earth orbit satellite 240 (FIG. 2) is selected. The gain and both horizontal and vertical beam-width of the antenna aperture 215 (FIG. 2) is calculated.

| | | |
|---|---|---|
| $R_{leo} := 500$ mi | | Low Earth Orbit Satellite Altitude |
| $L_{hr} := 22$ m | $L_{vr} := 12$ m | Receive Antenna Size |
| $\eta_r := 60\%$ | | Receive Antenna Efficiency |
| $G_r := \eta_r * (4\pi/\lambda^2) * (L_{hr} * L_{vr})$ | | Receive Antenna Gain |
| $G_{r\_dB} := 10 \log(G_r)$ | $G_{r\_dB} := 63.453$ | Recieve Antenna Gain in dB |
| $\theta_{hr\_3dB} := 0.88 \lambda/L_{hr}$ | $\theta_{hr\_3dB} = 0.069$ deg. | Transmit Antenna Az. Beamwidth |
| $\theta_{vr\_3dB} := 0.88 \lambda/L_{vr}$ | $\theta_{vr\_3dB} = 0.126$ deg. | Transmit Antenna Elv. Beamwidth |

Receiver Parameters

The radar receiver parameters which include noise figure in dB, system loss in dB, and the total processing gain.

| | |
|---|---|
| FdB := 4 | Receiver Noise Figure in dB |
| LsdB := 10 | Receiver System Loss in dB |
| GprocdB := 24 | Processing Gain in dB |

Detection Parameters

The following parameters: the radar target cross section, the time between false alarms, the signal to noise ratio per pulse, and the total number of pulses integrated non-coherently are needed to compute the probability of detection when integrating $n_p$ pulses.

| | | |
|---|---|---|
| $\sigma_T := 15$ m$^2$ | | Target RCS |
| $t_{fa} := 100$ sec | | Time Between False Alarms |
| $P_{fa} := 1/(B * t_{fa})$ | $P_{fa} = 1 \times 10^{-8}$ | Probability of False Alarm |
| SNR_d$_{dB}$ := 13 | | Threshold for Detection in dB |
| $n_p := 50$ | | Number of Pulses Integrated non-coherently |

Computing SNR vs. Range Product

The parameters that go into calculating the signal to noise ratio, for both the coherent integration time and the Doppler resolution are:

| | | |
|---|---|---|
| $G_t := 9.487 \times 10^5$ | $G_r := 2.215 \times 10^6$ | Transmit and Receive Gain Factors |
| $F := 10^{FdB/10}$ | $L_s := 10^{LsdB/10}$ | Noise Figure and System Loss Factors |
| $G_{proc} :=$ floor $* 10^{GProcdB/10}$ | | Indication of the number of pulses integrated coherently (integer number) |
| $t_{coherent} := $ PRI $* G_{proc}$ | $t_{coherent} = 2.51$ ms | |
| $B_d := 1/t_{coherent}$ | $B_d = 398.406$ Hz | |
| $V_{res} := (\lambda * B_d)/2$ | $V_{res} = 5.972$ msec$^{-1}$ | |

Atmospheric Effects

The parameters that define atmospheric attenuation for X-band frequency of clear weather are 1 mm/hr rain, and light fog (0.01 gm/m^3). Referring to FIG. 2, the relationship between the satellite altitudes and the height of the atmosphere are shown. Specifically, the range ($R_{gs}$) 230 of the satellite in geosynchronous orbit 225 is shown relative to the range ($R_{leo}$) 250 of the satellite in low earth orbit 240. Additionally, the height of the atmosphere dose not exceed the distance 270 and is delineated as $H_a$. The relative heights at which rain 280 ($H_r$) and fog 290 ($H_{fog}$) are shown for comparison to the range of the satellite in low earth orbit 240. The acquisition range computed in this case is worst case.

The following data is for Ka-Band atmospheric effects (35 GHz):

| | |
|---|---|
| La_dB := 0.02 | Atmospheric attenuation in dB/km - one way averaged over 100 Kft of atmosphere |
| Lr_1 mm_dB := 0.034 | Rain Attenuation in dB/km - one way |
| Lfog_dB := 0.06 | Fog Attenuation in dB/km - one way |
| $H_a$ := 30 km | Height of Atmosphere in km |
| $H_r$ := 1 km | Height of Rain Storm in km |
| $H_{fog}$ := 0.1 km | Height of Fog in km |

For geosynchronous orbit, the transmitter is located at 22,800 miles.

| | |
|---|---|
| $R_{gs} := 3.648 \times 10^4$ km | Range of Transmitter to Target |
| Rtt_free := $R_{gs} - H_a$ | Range in Free Space in km |
| Rtt_a := $H_a - H_r$ | Range in Atmosphere in km |
| Rtt_r := $H_r - H_{fog}$ | Range in Rain in km |
| Rtt_fog := $H_{fog}$ | Range in fog in km |
| $\Psi$ := 45 deg. | Angle of Inclination From Vertical |
| $L_r := 10^{(2*Rtt\_r*Lr\_1\,mm\_dB)/(10\,km*cos(\psi))}$ | |
| $L_{fog} := 10^{(2*Rtt\_fog*Lfog\_dB)/(10\,km*cos(\psi))}$ | |
| $L_{a1} := 10^{(2*Rtt\_a*La\_dB)/(10\,km*cos(\psi))}$ | |

Computing SNR as a Function of Range Product

The signal to noise ratio is computed from the bi-static radar range equation.

| | |
|---|---|
| $R_p := 100\,mi^2, 200\,mi^2 \ldots 1000000\,mi^2$ | Range Product Variable Rtt times Rrt |
| $SNR(R_p) := (P_t * G_r * G_t * \lambda^2 * \sigma_T * G_{proc})/$ $((4\pi)^3 * R_p^2 * k * T * B * F * L_s * L_r * L_{fog} * L_{a1})$ | Which is the Signal to noise ratio vs. range product. |
| $SNR_{dB}(R_p) := 10\,\log(SNR(R_p))$ | Signal to noise ratio in dB |
| $R_{tr\_a} := 1\,mi^2, 2\,mi^2 \ldots 10000\,mi^2$ | Range of Receiver to Target in atmos. in km |
| $SNR(R_{tr\_a}) := (P_t * G_r * G_t * \lambda^2 * \sigma_T * G_{proc})/$ $((4\pi)^3 * R_{tr\_a}^2 * R_{gs}^2 *$ $k * T * B * L_s * F * L_r * L_{fog} * L_{a1})$ | |
| $SNR_{dB}(R_{tr\_a}) := 10\,\log(SNR(R_{tr\_a}))$ | |

Estimation of Probability of False Alarm

These are the basic parameters needed to compute the probability of false alarm; the number of range gates, the coherent integration time, the time between false alarms and the processing gain. The probability of false alarm is then computed using the equation of Pfa.

| | | |
|---|---|---|
| $N_{rg}$ := floor((PRI – $\tau$)/$\tau$) | $N_{rg}$ = 9 | Number of Range Gates |
| $B_d$ := PRF/$G_{proc}$ | $B_d$ = 398.406 Hz | Doppler filter Bandwidth |
| coherent_intg_time := 1/$B_d$ | coherent_intg_time = 2.51 ms | |
| CPI := coherent_intg_time | | |
| total_intg_time := CPI * $n_p$ | total_intg_time = 125.5 ms | |

-continued

| | |
|---|---|
| $P_{fa}$ := coherent_intg_time/ ($t_{fa} * N_{rg} * G_{proc}$) | $P_{fa} = 1.111 \times 10^{-8}$ |
| $R_{tr\_at}$ := 156 mi | $SNR_{dB}(R_{tr\_at})$ := 1.579 |

Assuming the target is near the ground, the total distance from the target to receiver is:

| | |
|---|---|
| Range := $R_{tr\_at}$ | Range = 249.6 km |

Computing Probability of Detection for the Coherent Integration Case

A subroutine to compute the probability of detection is implemented for the case of a non-fluctuating target i.e. a Marcum Model.

| | | | |
|---|---|---|---|
| N := $n_p$ | Pfa := $P_{fa}$ | snrdB := $SNR_{db}$(Range) | $P_d$ = 94.732% |

Computing Probability of Detection for the Non-Coherent Case

This is the same as in the above case except the integration is done non-coherently.

| | |
|---|---|
| $SNR(R_{rt\_a}) :=$ $(P_t * G_r * G_t * \lambda^2 * \sigma_T)/$ $((4\pi)^3 * R_{rt\_a}^2 * R_{gs}^2 * k *$ $T * B * L_s * F * L_r * L_{fog} * L_{a1}))$ $SNR_{dB}(R_{rt\_a}) := 10\,\log(SNR(R_{rt\_a}))$ | |
| $R_{tr\_at}$ := 9.8 mi | Range of Receiver to Target in Atmosphere |
| $P_{fa} := \tau/t_{fa}$   $P_{fa} = 1 \times 10^{-8}$ N := $n_p$   Pfa := $P_{fa}$   snrdb := $SNR_{dB}(R_{tr\_at})$ | Probability of False Alarm $P_d$ = 95.072% |
| Total_noncoherent_intg_time := PRI * $n_p$ | Total_noncoherent_intg_time = 500 µs |
| $R_{total\_noncoherent} := R_{tr\_at}$ | $R_{total\_noncoherent}$ = 9.8 mi |

Computing Antenna Beam Spread on the Ground

The following calculation shows the amount of beam spread or the footprint of the antenna pattern on the ground based on a geosynchronous orbit.

| | |
|---|---|
| BS_ground := $R_{gs} * \theta_{t\_3dB}$ | Foot print on the Ground |
| BS_ground = 92.962 km | Foot print on the Ground in km |
| Foot_print_LEO := ($R_{gs}$ – Range * cos($\psi$)) * $\theta_{t\_3dB}$ | |
| Foot_print_LEO = 92.512 km | |
| $R_{c\_LEO}$ := Range * sin($\psi$) | $R_{c\_LEO}$ = 176.494 km |

CONCLUSIONS

The specific requirements for a particular system may be simulated based on this design. This simulation indicates that a bi-static radar system from a Geosynchronous orbit is practical.

It is to be understood that the foregoing detailed description is exemplary and explanatory only and is not to be viewed as being restrictive of embodiments of the invention, as claimed. The invention is capable of other and different embodiments, and its several details are capable of modifications in various obvious respects, all without departing from the invention. Accordingly, the drawings and description are to be regarded as illustrative in nature, and not as restrictive. Thus the scope of this invention should be determined by the appended claims, drawings and their legal equivalents.

What is claimed is:

1. A method for tracking a plurality of targets, comprising:
transmitting a Doppler radar signal from a geosynchronously orbiting satellite, wherein said geosynchronously orbiting satellite has an electronically phase steered antenna for transmitting said Doppler radar signal;
creating a plurality of reflected Doppler radar signals by illuminating said plurality of targets with said Doppler radar signal;
bi-statically receiving said plurality of reflected Doppler radar signals reflected by said plurality of targets, wherein said plurality of reflected Doppler radar signals are received by a receiving platform;
processing within said receiving platform said plurality of reflected Doppler radar signals, wherein a processing output from said receiving platform is a tracking data set representing a present and a predicted location for each of said targets;
computing within said receiving platform a fire control solution responsive to an update of said tracking data set for each of said targets;
communicating a result of said fire control solution to said geosynchronously orbiting satellite;
modifying a pointing angle of said electronically phase steered antenna to maintain a continuous surveillance of said plurality of targets; and
updating said fire control solution by repeatedly communicating an updated result of said fire control solution from said receiving platform to said geosynchronously orbiting satellite and repeatedly modifying said pointing angle of said electronically phase steered antenna in response to said updated result of said fire control solution.

2. The method of claim 1, wherein said receiving platform is a satellite in low earth orbit.

3. The method of claim 1, wherein said receiving platform is an airborne aircraft.

4. The method of claim 1, wherein said receiving platform is a ground based station.

5. The method of claim 1, wherein said transmitted radar tracking signal is a Doppler radar tracking signal.

6. The method of claim 1, wherein said processing means uses a coherent Doppler signal processing scheme, determines a false alarm probability, computes a probability of detecting said target and estimates a range from said receiving platform to each of said targets.

* * * * *